(12) United States Patent
Chollou

(10) Patent No.: US 12,559,241 B2
(45) Date of Patent: Feb. 24, 2026

(54) PARACHUTE WITH SEGMENTED SLIDERS

(71) Applicant: SAFRAN ELECTRONICS & DEFENSE, Paris (FR)

(72) Inventor: Ronan Chollou, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 18/729,356

(22) PCT Filed: Jan. 30, 2023

(86) PCT No.: PCT/FR2023/050117
§ 371 (c)(1),
(2) Date: Jul. 16, 2024

(87) PCT Pub. No.: WO2023/148446
PCT Pub. Date: Aug. 10, 2023

(65) Prior Publication Data
US 2025/0066026 A1      Feb. 27, 2025

(30) Foreign Application Priority Data

Feb. 2, 2022    (FR) ...................................... 2200879

(51) Int. Cl.
B64D 17/34          (2006.01)
B64D 17/06          (2006.01)
(52) U.S. Cl.
CPC ........... B64D 17/343 (2013.01); B64D 17/06 (2013.01)
(58) Field of Classification Search
CPC ....... B64D 17/00; B64D 17/06; B64D 17/343
See application file for complete search history.

(56) References Cited

U.S. PATENT DOCUMENTS 2,525,798 A    10/1950  Hattan
6,131,856 A    10/2000  Brown
(Continued)

FOREIGN PATENT DOCUMENTS

DE        918005 C      9/1954
FR        2524861 A1    10/1983

OTHER PUBLICATIONS

YouTube, Humvee Airdrop from C-17, Jul. 28, 2016, [https://www.youtube.com/watch?v=4X8WSs1oFU&T=133s] (Year: 2016).*
(Continued)

*Primary Examiner* — Timothy D Collins
*Assistant Examiner* — Justin Michael Heston
(74) *Attorney, Agent, or Firm* — Kilpatrick Townsend & Stockton LLP

(57)          ABSTRACT

This parachute comprising a canopy having a leading edge and a trailing edge opposite the leading edge, suspension lines each having a first end attached to the leading edge and a second end that is designed to bear a load, and a slider having through-elements for the suspension lines to pass through, said elements being connected to one another by attachment means, each of said through-elements being passed through by one of the suspension lines and being free to move in translation relative thereto, the slider being designed to slide along the suspension lines that pass through the through-elements in the direction from the first ends of said suspension lines towards their second ends under the effect of gravity and the force generated by the suspension lines spreading apart when the parachute starts a descent, tightening and spreading apart the suspension lines as the canopy inflates.

9 Claims, 3 Drawing Sheets

(56)          References Cited

U.S. PATENT DOCUMENTS

| | | | |
|---|---|---|---|
| 7,000,872 B1 * | 2/2006 | Fujiwara ................ | B64D 17/14 |
| | | | 244/142 |
| 7,028,951 B1 | 4/2006 | Sadeck | |
| 2006/0231684 A1 | 10/2006 | Sadeck | |
| 2007/0034744 A1 | 2/2007 | Berland | |

OTHER PUBLICATIONS

International Application No. PCT/FR2023/050117, International Search Report and Written Opinion mailed on May 9, 2023, 14 pages (3 pages of English translation and 11 pages of original document).

* cited by examiner

PARACHUTE WITH SEGMENTED SLIDERS

CROSS REFERENCE TO RELATED APPLICATIONS

This application is a U.S. national phase under 35 U.S.C. § 371 of International Patent Application No. PCT/FR2023/050117, filed on Jan. 30, 2023, which claims priority to French Patent Application No. 2200879, filed on Feb. 2, 2022, the entire contents of both of which are incorporated herein by reference.

TECHNICAL FIELD

The present invention relates to parachutes which can be used for a variety of purposes such as the slowed down descent of a load until it reaches the ground, in particular equipment (cargo parachute) or personnel (troop parachute), slowing down the fall of a load by an extractor parachute before deployment of the landing parachute (space parachute), or slowing down an aircraft just after it lands (braking parachute).

Parachutes compatible with this invention include in particular hemispherical, square, cross, triangular or any other type of parachute except "wing" type parachutes, due to their different opening kinematics, their boxed construction with little air volume to fill.

The present invention aims to create a parachute that repeatedly sequences the opening of the parachute during deployment, while limiting the descent, i.e. loss of height during deployment.

PRIOR ART

Parachutes are known with sliders that provide deceleration by using their aerodynamics so as to slow down and sequence the opening of the canopy of the parachute when it is deployed in descent.

These systems use a continuous annular or circular slider inserted on all the suspension lines with a fabric surface generating an aerodynamic drag.

However, this continuous slider solution generating aerodynamic drag cannot be applied to drops at very low altitude due to the fact that the time delay is too long, increasing the deployment times and resulting in excessive descents, i.e. excessive loss of height during the deployment phase.

Other systems slow down deployment by using a mechanical block or a pyrotechnic system to slow down deployment, involving, for example, a line running along the entire leading edge of the canopy of the parachute to tighten it and prevent it from deploying too quickly, although this line has to be released mechanically after a few seconds.

These types of mechanical or pyrotechnic systems have numerous constraints: the addition of weight, the need for a complex assembly to be initialised at the moment of the drop, the delicate use of pyrotechnics, and above all very high costs.

The various types of solutions known on the market and set out above result in a sharp slow-down of the opening or complex implementation making them incompatible with drops at very low altitudes. In order to enable these drops at low altitude, the prior art shows that the parachutes are not fitted with a device set out above, which results in numerous fabric burns and tears, in particular to the canopy and suspension lines, caused by poor sequencing of the deployment phase, and random kinematics, which are too quick and therefore too violent.

They are therefore unsatisfactory and leave a number of problems to be resolved, which are all the more frequent when using a "cluster" of parachutes grouped together to carry a common load.

DISCLOSURE OF THE INVENTION

The aim of the invention is to overcome at least some of the aforementioned problems and propose a parachute capable of combining the advantages of speed, simplicity and reliability for its implementation, even in cluster use and for drops at low altitude.

In light of the above, the object of the invention is a parachute including a canopy having a leading edge and a trailing edge opposite the leading edge, suspension lines each having a first end attached to the leading edge and a second end that is designed to bear a load, and a slider having through-elements for the suspension lines to pass through, said elements being connected to one another by attachment means, each of said through-elements being passed through by one of the suspension lines and being free to move in translation relative thereto, the slider being designed to slide along the suspension lines that pass through the through-elements in the direction from the first ends of said suspension lines towards their second ends when the parachute starts a descent, tightening and spreading apart the suspension lines as the canopy inflates.

In one embodiment, the through-elements are formed by rings and the attachment means have lines each connecting two successive rings.

In another embodiment, the attachment means have a strap and the through-elements are formed by eyelets passing through said strap.

Advantageously, the slider is in abutment with the leading edge.

Preferably, the distance between two through-elements of a same slider is strictly less than that separating the first ends of two suspension lines at the leading edge.

There are for example three, four or five sliders.

The parachute can also provide that the attachment means are made of rope, strap or fabric.

The parachute preferably has a riser to which the second ends of the suspension lines and the load are connected.

The invention also relates to a parachute cluster in which the respective risers are connected to a same load.

BRIEF DESCRIPTION OF THE DRAWINGS

The invention will be better understood upon detailed study of one embodiment considered as a non-limiting example and illustrated by the appended drawings, in which.

DETAILED DESCRIPTION

Figure 1:
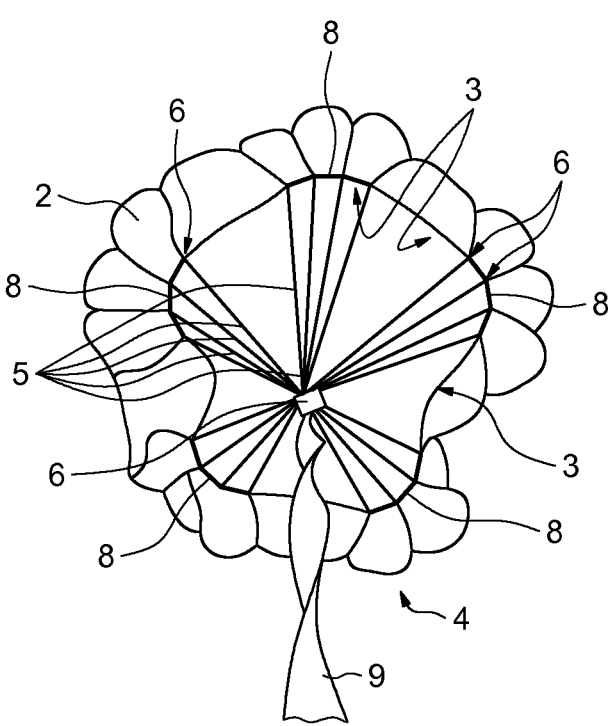
FIG. 1 shows a parachute with five sliders and in the process of inflating during a descent, shown from below.

Reference is made to FIG. 1 which shows a parachute 1 according to the invention, which has a canopy 2 having a leading edge 3 and a trailing edge 4 opposite the leading edge 3.

The leading edge 3 is the one intended to divert the air during a descent with the parachute 1, so as to direct the air towards the centre of the canopy 2 to unfold it.

The canopy 2 can be deployed too quickly in the event of gaining speed, causing too much air to enter the canopy 2, opening it too suddenly and exposing it to a high risk of tearing.

The parachute 1 has suspension lines 5 each having a first end 6 attached to the leading edge 3 and a second end 7 designed to bear a load 10, which can, for example, be equipment or personnel.

The parachute 1 preferably has a riser 9 to which the second ends 7 of the suspension lines 5 and the load 10 are connected.

The riser 9 allows the load 10 to be centred vertically under the centre of the canopy 2 and to evenly distribute the holding forces exerted by the suspension lines 5 on the load 10.

The parachute 1 also has at least two sliders 8 having through-elements 12 for the suspension lines to pass through, said through-elements being connected to one another by attachment means 11.

Each of the through-elements 12 of the sliders 8 is passed through by one of the suspension lines 5.

Each slider 8 is thus free to move in translation relative to each of the suspension lines 5 which passes through its through-elements 12, over which the slider 8 can slide under the effect of gravity and the force generated by the suspension lines spreading apart.

More specifically, each slider 8 is designed to slide along the suspension lines 5 that pass through the through-elements 12 from the first ends 6 of said suspension lines 5 towards their second ends 7 under the effect of gravity and the force generated by the suspension lines spreading apart when the parachute 1 starts a descent, tightening and spreading apart the suspension lines 5 as the canopy 2 inflates.

The parachute 1 thus does not have any fabric or canopy extending inside the volume formed by the suspension lines 5 under the canopy 2, as is the case in various aerodynamic slider parachutes in the prior art.

The presence and sliding of the sliders 8 make the deployment of the canopies 2 of the families of parachutes mentioned above more reliable by limiting damage to the fabric of the canopy 2 and the suspension lines 5.

They also help to reduce shocks during the deployment of the canopy 2 when the drop speeds are high and enable a stable descent speed to be reached more quickly, which is particularly useful for drops at low altitude, i.e. below around eight metres from the ground.

The slider 8 may be in abutment with the leading edge 3, as is the case in FIG. 1.

The slider 8 is in particular in abutment with the leading edge 3 when it is folded before use, and in the very first stages of descent when the parachute 1 is dropped.

Positioning a given slider in the abutment position makes it possible to block the movement of the portion of the canopy 2 whose suspension lines 5 are connected to this slider 8, during the first few seconds of the deployment phase, which reduces the air intake of the leading edge 6 and therefore slows down the deployment of this portion of the canopy 2, and thus reduces the shock during the deployment of the canopy 2 likely to cause it to tear or flip over resembling the shape of a butterfly in the case of a non-sequenced opening.

The canopy 2 is conventionally divided into sections 14, and the number of sections 14 is equal to the number of suspension lines 5.

"Section" is understood to mean an element of the parachute 1 to which the suspension lines are attached and which is made of one or more assembled pieces which enable the parachute 1 to have a leading edge 3 and a trailing edge 4.

The number of sliders 8 is advantageously comprised between fifteen and twenty-five percent of the number of sections 14.

Indeed, tests on an annular slider, i.e. a single slider as in the prior art, and an annular slider divided into two, have shown their ability to heavily delay the deployment of the canopy to the extent of completely preventing it, resulting in the failure of the canopy to open and an impact of the load on the ground.

For these tests, even if deployment could have been completed if the drop altitude were higher, they show the inadequacy of two sliders for drops at low altitude.

Tests dividing the slider into three, four and five portions made it possible to perfectly delay the deployment, unlike parachutes in the prior art with annular or circular sliders that generate aerodynamic drag and are not suitable for drops at low altitude.

Having these numbers of portions eases the constraints on the leading edge 3 located between 2 sliders and enables the air flow to gradually fill the canopy 2 during descent, facilitating deployment of the parachute 1 with a reasonable loss of height for low altitude.

The parachute 1 is thus formed by at least two sliders 8, with each of the sliders 8 connecting a plurality of suspension lines 5, and the number of sliders corresponds advantageously to fifteen to twenty-five percent of the number of sections 14.

In the example given, the number of sliders 8 is ideally three.

The sliders 8 are thus placed on the suspension lines 5 so as to form a segmentation alternating between areas with sliders 8 and areas without sliders 8.

The sliders 8 can also be installed in abutment against the leading edge 3.

Figure 2:
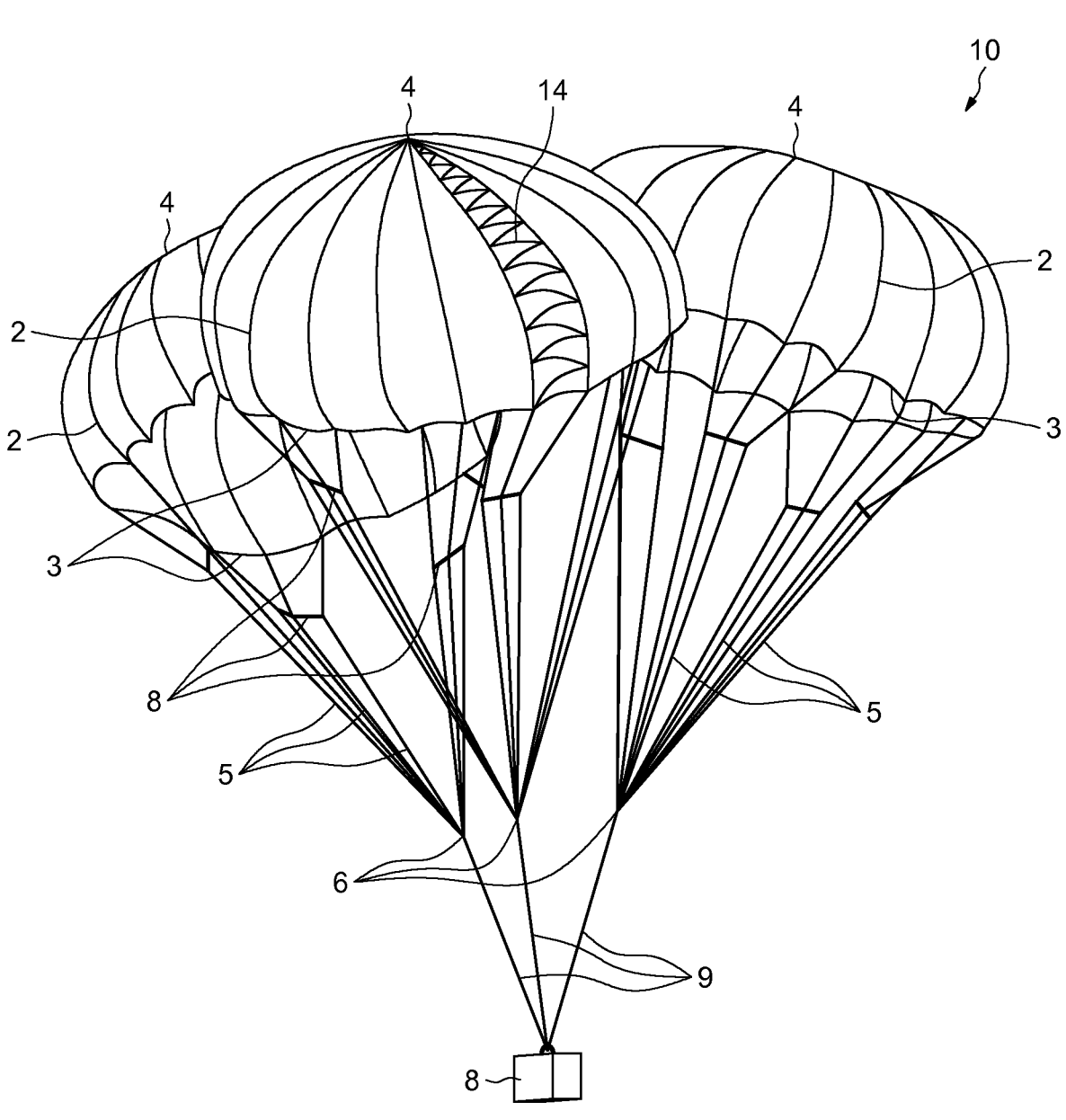
FIG. 2 shows a cluster of three parachutes during a descent, in front view.

The invention also relates to a cluster or group of parachutes 13 as shown in FIG. 2.

The cluster of parachutes 13 has a plurality of shared parachutes 1 for carrying a same load 10.

Each of the respective risers 9 of the parachutes 1 are therefore connected to the common load 10.

The greater the number of sliders 8, the less the deployment of the parachute 1 or cluster 13 is delayed.

The fewer sliders 8 there are, and the closer the through-passages 12, the longer the deployment as this configuration heavily constrains the deployment of the canopies 2.

Consequently, there is a low risk of damage when using a plurality of canopies 2 in a cluster 13, but the deployment times are not compatible with a drop at low altitude.

Conversely, the greater the number of sliders 8, and the further away the through-elements 12 are, the less the canopy 2 is constrained and the quicker it can be deployed.

Consequently, when opening in a position close to the horizontal and/or in a disturbed flow, deployment occurs too quickly and the sequencing between a plurality of canopies 2 is not controlled, which can lead to damage.

Figure 3:
FIG. 3 shows a first embodiment of the slider.
Figure 4:
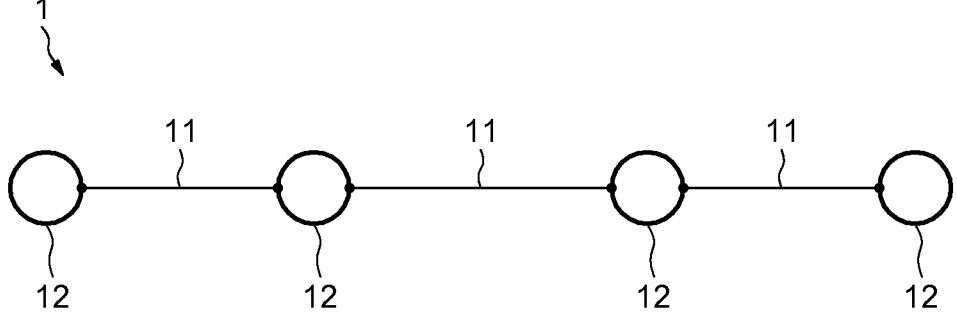
FIG. 4 shows a second embodiment of the slider.

The optimum number of sliders 8 is therefore between fifteen and twenty-five percent of the number of sections 14. FIGS. 3 and 4 show two embodiments of the sliders 8.

In the first embodiment shown in FIG. 3, the attachment means 11 have a strap and the through-elements 12 are formed by eyelets passing through said strap.

In the second embodiment shown in FIG. 4, the through-elements 12 are formed by rings and the attachment means 11 have lines each connecting two successive rings.

The distance between two through-elements 12 of a same slider 8 is, for example, strictly less than that separating the first ends 6 of two suspension lines 5 at the leading edge 3.

The number of sliders 8 and the distance between these elements 12 depend on the desired time delay for each parachute 1.

A relatively short distance between each element 12 enables the leading edge 3 of the portion located between two sliders 8 to be tensioned, and this tension enables the parachute 1 to fill up from the centre and thus be solid and stable when it is deployed.

The number of through-elements depends on the number of suspension lines.

The number of sliders 8 and the distance between the through-elements 12 differs depending on the size of the parachute 1 and deployment conditions (low altitude for cargo drops, or high altitude for space).

At low altitude, it is desirable to not increase the canopy 2 deployment times and to only limit damage.

The parachute 1 can also provide that the attachment means 11 are made of rope, strap or fabric.

The through-elements 12 are made of a material that provides a good level of mechanical strength and adequate friction for the sliders along the suspension lines 5, for example plastic.

The use of a strip or lines combined with through-elements 12 formed by metallic rings or metallic eyelets means that the sliders 8, and therefore the entire parachute 1, can still be folded without the risk of damaging the canopy 2 with the through-elements 12.

The result is a parachute 1 which, during the deployment phase, allows the sliders 8 to hold the suspension lines 5 together and constrain the leading edge 3, thus slowing down the deployment of the canopy 2 as this is done by the volume of air of the canopy 2 gradually filling up in the centre and not, as in the prior art, by random deployment of the leading edge 3 subjected to the disturbed air flow.

This brief deployment delay enables the parachute 1 to have just enough time to get closer to its vertical position during the inflation phase, ensuring deployment in the best airflow conditions, because, unlike sliders conventionally used on parachutes, those according to the invention do not have an aerodynamic action but only a mechanical one using the friction of the suspension lines in the eyelets or rings.

The invention claimed is:

1. A parachute including:
   a canopy having a leading edge and a trailing edge opposite the leading edge;
   suspension lines, each suspension line having a first end attached to the leading edge and a second end that is configured to bear a load; and at least two sliders, each slider having through-elements for the suspension lines to pass through, said through-elements being connected to one another by attachment means, each of said through-elements being passed through by one of the suspension lines and being free to move in translation relative thereto, wherein each of the at least two sliders is configured to slide along the suspension lines that pass through the through-elements in the direction from the first ends of said suspension lines towards their second ends when the parachute starts a descent, tightening and spreading apart the suspension lines as the canopy inflates, wherein:
   the canopy has sections,
   the at least two sliders are separate and each slider is formed by a separate strap formed by a strip and such that the strip of one slider of the at least two sliders is disconnected from the strip of the other slider of the at least two sliders, and each slider is configured to slide along the suspension lines that pass through the through-element from the first ends of said suspension lines towards their second ends under the effect of gravity and the force generated by the suspension lines spreading apart when the parachute starts a descent, tightening the suspension lines as the canopy inflates,
   each slider is free to move in translation relative to each of the suspension lines which pass through its through-elements.

2. The parachute according to claim 1, wherein the through-elements are formed by rings and the attachment means have lines each connecting two successive rings.

3. The parachute according to claim 1, wherein the attachment means have said straps and the through-elements are formed by eyelets passing through said straps.

4. The parachute according to claim 1, wherein the slider is in abutment with the leading edge.

5. The parachute according to claim 1, wherein the distance between two through-elements of a same slider is strictly less than that separating the first ends of two suspension lines at the leading edge.

6. The parachute according to claim 1, wherein the canopy has sections and the number of sliders corresponds to fifteen to twenty-five percent of the number of sections.

7. The parachute according to claim 1, wherein the attachment means are made of rope, strap or fabric.

8. The parachute according to claim 1, also having a riser to which the second ends of the suspension lines and the load are connected.

9. The parachute cluster having a plurality of parachutes according to claim 8, the respective risers of which are connected to a same load.

* * * * *